United States Patent [19]

Tatsuguchi et al.

[11] 4,247,741
[45] Jan. 27, 1981

[54] REPRODUCING TRANSDUCER FEEDING DEVICE IN A ROTARY RECORDING MEDIUM REPRODUCING APPARATUS

[75] Inventors: Kazuo Tatsuguchi, Yokohama; Atsumi Hirata, Yamato; Tetsushi Akasaka, Ebetsu; Kanji Kayanuma, Hadano, all of Japan

[73] Assignee: Victor Company of Japan, Limited, Yokohama, Japan

[21] Appl. No.: 973,688

[22] Filed: Dec. 27, 1978

[30] Foreign Application Priority Data

Dec. 28, 1977 [JP] Japan .............................. 52-158787

[51] Int. Cl.³ .............................................. G11B 21/10
[52] U.S. Cl. ........................................ 369/43; 360/77; 369/47
[58] Field of Search ............... 358/128, 128.5; 360/77; 179/100.3 V, 100.3 D, 100.4 D, 100.1 G

[56] References Cited

U.S. PATENT DOCUMENTS

| | | | |
|---|---|---|---|
| 3,919,697 | 11/1975 | Walker | 360/77 |
| 4,087,842 | 5/1978 | Manly | 360/77 |
| 4,092,682 | 5/1978 | Andrews, Jr. et al. | 360/77 |
| 4,135,217 | 1/1979 | Jacques et al. | 360/77 |
| 4,152,727 | 5/1979 | Tatsuguchi et al. | 358/128 |
| 4,160,268 | 7/1979 | Goto et al. | 358/128 |

Primary Examiner—Bernard Konick
Assistant Examiner—Donald McElheny, Jr.

[57] ABSTRACT

The feeding device feeds a reproducing transducer in an apparatus for reproducing signals from a rotary recording medium having an information signal recording track formed thereon in a spiral path or concentric circular form and having reference signals recorded thereon interrelatedly with the information signal track. The reproducing transducer has a reproducing element for reproducing the information signal and the reference signals recorded on the rotary recording medium and tracking control mechanism for accomplishing tracking control so that the reproducing element traces the information signal track. The feeding device comprises a driving motor for driving the reproducing transducer in feeding travel over the rotary recording medium in the radial direction thereof, a circuit for producing a tracking control signal in response to the reference signals reproduced from the reproducing transducer and supplying the tracking control signal to the tracking control mechanism, a circuit for obtaining a DC component signal of the tracking control signal thus produced, and a circuit for controlling the driving operation of the driving motor in response to the DC component signal thus obtained.

4 Claims, 13 Drawing Figures

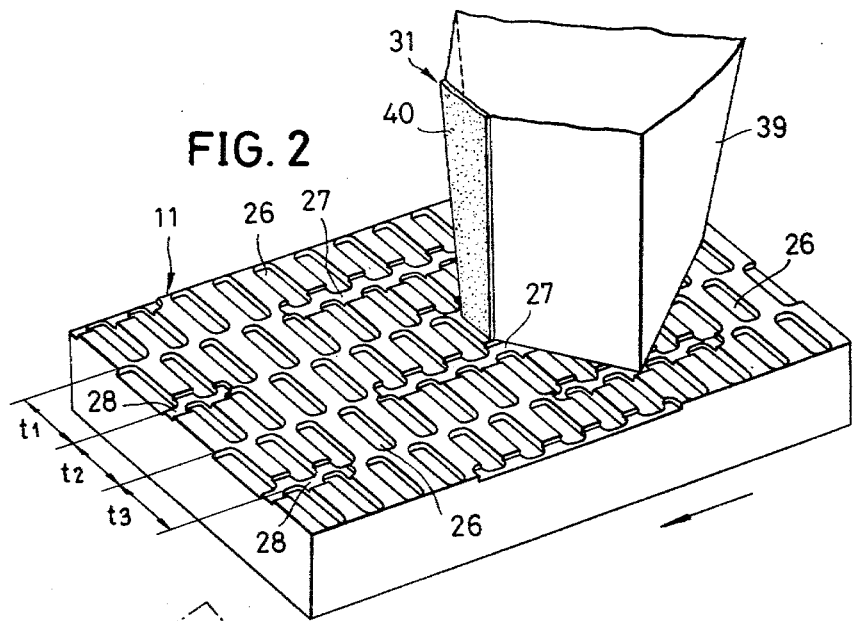
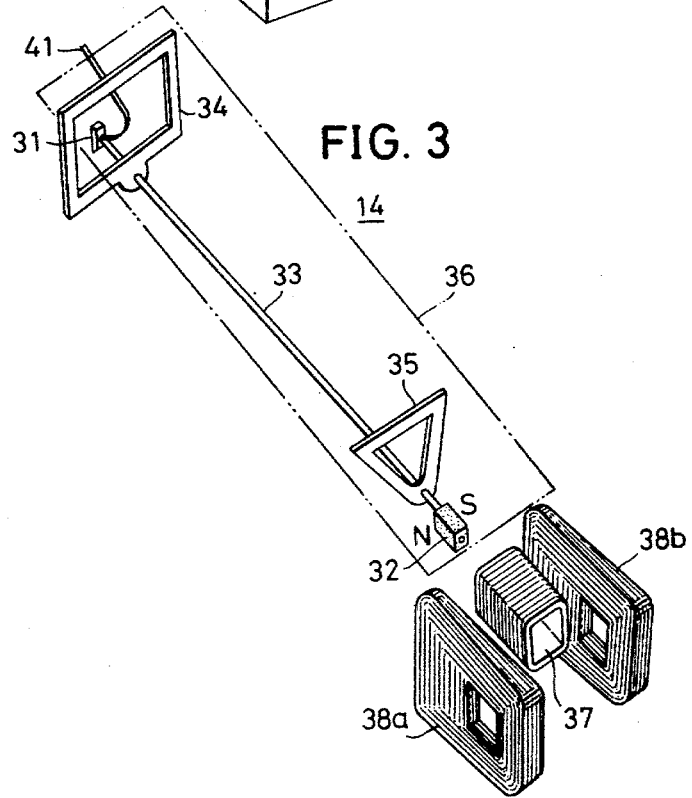

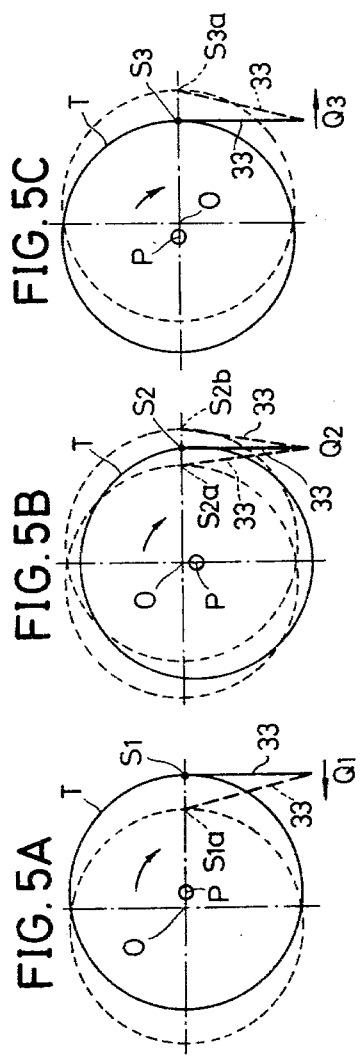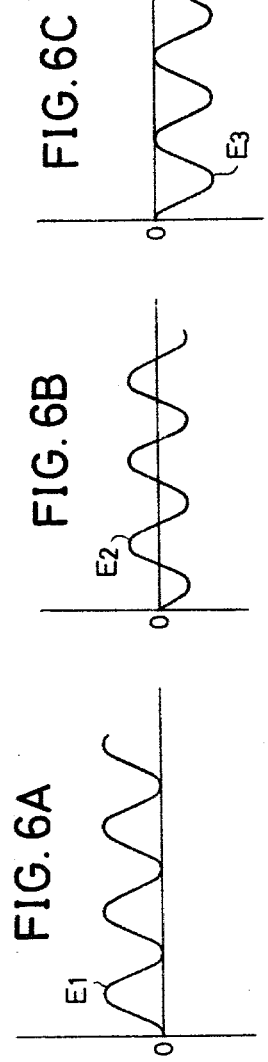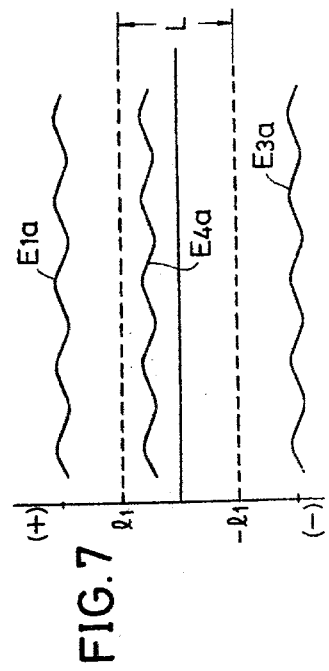

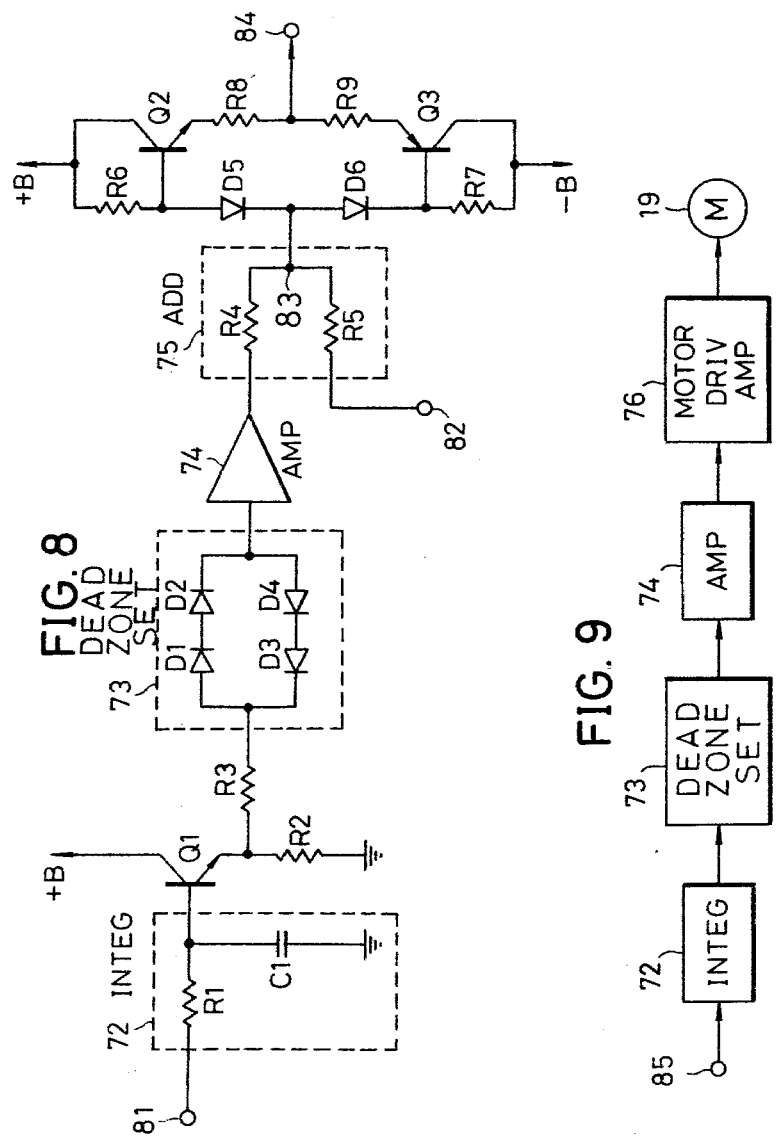

REPRODUCING TRANSDUCER FEEDING DEVICE IN A ROTARY RECORDING MEDIUM REPRODUCING APPARATUS

BACKGROUND OF THE INVENTION

The present invention relates generally to devices for feeding reproducing transducers in apparatuses for reproducing rotary recording mediums. More particularly, the invention relates to a device which, in an apparatus for reproducing an information signal from a rotary recording medium by means of a reproducing transducer, moves the reproducing transducer in feeding travel along the radial direction of the rotary recording medium in a manner such that the transducer always carries out excellent tracking of the track on the recording medium.

Known system for recording and reproducing information signals (such as video signals and/or audio signals) on and from disc-shaped, rotary mediums (referred to hereinafter simply as discs) are broadly divided into systems using optical reproduction, systems using a reproducing stylus employing a piezoelectric element, and systems utilizing variations in the electrostatic capcitance between an electrode on the reproducing stylus and the recorded surface of the disc.

In accordance with a known electrostatic capacitance system, recording is accomplished by forming a spiral guide groove in the disc for guiding the reproducing stylus. As the same time, pits are formed in responsive correspondence with an information signal to be recorded on the bottom surface of the groove. In the reproducing system, the reproducing stylus is guided by the guide groove. The stylus traces the track within the groove and reproduces the signal in response to variations in the electrostatic capacitance.

In this known system, however, a reproducing stylus guiding groove is provided on the disc. The reproducing stylus is compulsorily guided by this guide groove. It is not possible for the reproducing stylus to undergo operations such as riding over the groove wall of one track, moving into another track and returning to the original track. If the reproducing stylus were to be forced to undergo such an operation, the groove and the stylus would be damaged. For this reason, it has not been possible in this known system to carry out special reproduction such as quick-motion picture reproductin, slow-motion picture reproduction, still-picture reproduction, and random access motion.

Accordingly, with the aim of overcoming the various problems of the known systems described above, a novel "Information signal recording and reproducing system" is disclosed in the specification of U.S. patent application Ser. No. 785,095, filed Apr. 6, 1977 and in the specification of U.S. patent application Ser. No. 33,324, filed Apr. 25, 1979, which is a continuation-in-part of the parent application Ser. No. 785,095. According to this system, the recording system forms pits in accordance with the information signal being recorded along a spiral track on a flat disc shaped recording medium, without forming a groove therein. In the reproducing system, a reproducing stylus traces over and along this track thereby to reproduce the recorded information signal in response to variations in the electrostatic capacitance.

By the use of this previous system, the recording track has no groove. There is no possibility whatsoever of the reproducing stylus or the recording medium being damaged. The stylus can trace the same portion of the track repeatedly many times, where, by a so-called random access motion, a reproducing stylus is moved at high speed to a desired position on a disc thereby to reproduce a desired information, in addition to a special reproduction such as still, slow motion, or quick motion reproduction.

In this system, since a groove for guiding the reproducing stylus is not provided on the disc, pilot or reference signals should be recorded on or in the vicinity of a track of the information signal, such as video signal, on a rotary disc. At the time of reproducing, the reference signals are reproduced together with the video signal. Tracking servo control is carried out so that the reproducing stylus traces accurately along the track in response to the reproduced reference signals.

In order to carry out a good tracking servo operation, it is desirable that the control operation be so accomplished that the output voltage of the control circuit is a voltage in the vicinity of the center of its control dynamic range. In general, the above mentioned reproducing stylus is mounted at the extreme free end of a cantilever, and, by causing the cantilever to undergo displacements, the tracking servo operation is so carried out that the reproducing stylus correctly traces the desired track. In this case, it is desirable that the tracking servo operation be carried out as the cantilever undergoes displacement with its neutral position as the center of motion.

However, in the press-moulding of a rotary recording medium (hereinafter referred to merely as a disc), in general, an offsetting (eccentricity) of its central hole occurs, although this may be slight. Furthermore, the central hole of a disc is formed to be of a diameter somewhat greater than the diameter of the upper spindle of the turntable on which the disc is placed. For these reasons, when the disc is placed on the turntable and rotated, the dimensional center of the disc and the center of rotation of the disc rotating together with the turntable do not coincide, strictly speaking, and are mutually eccentric in many cases.

On one hand, at the start of reproduction, the cantilever is in its neutral state when the reproducing stylus is lowered onto the disc. Then, when the disc is in an eccentric state as described above, tracking control is carried out in some extreme causes with the cantilever displaced to only one side from its neutral position depending on the timing of the lowering of the reproducing stylus as described hereinafter with reference to the drawings. In such a case, the control system, including the cantilever and the control circuit, must carry out a control operation by exceeding the limit of normal control operation, whereby there arises a problem in that normal tracking control operation cannot be accomplished.

SUMMARY OF THE INVENTION

Accordingly, it is a general object of the present invention to provide a novel and useful device for feeding the reproducing transducer in an apparatus for reproducing a rotary recording medium, which device affords solutions to the above described problems.

Another and specific object of the invention is to provide a reproducing transducer feeding device in a rotary recording medium reproducing apparatus, which feeding device, by utilizing a control signal for a reproducing element tracking control mechanism in the reproducing transducer, so controls the feed of the transducer that the tracking control mechanism can operate with the neutral position as the center position thereby to cause the reproducing element of the transducer to trace correctly the track of the disc. By this provision of the device of the present invention, normal tracking control operation can always be accomplished even when there is an eccentricity in a disc being reproduced.

Still another object of the invention is to provide a reproducing transducer feeding device in a rotary recording medium reproducing apparatus, which feeding device operates to control the feed of the transducer only when the above mentioned tracking control mechanism is greatly offset by a displacement exceeding a predetermined value from the neutral position.

Other objects and further features of the invention will be apparent from the following detailed description with respect to preferred embodiments of the invention when read in conjunction with the accompanying drawings.

BRIEF DESCRIPTION OF THE DRAWINGS

In the drawings:

FIG. 2 is a perspective view, on a large scale, showing a part of a rotary recording medium together with a tip part of a reproducing stylus;

FIG. 3 is an exploded perspective view showing an example of a signal pickup device as a reproducing transducer in a reproducing apparatus indicated in FIG. 1;

FIGS. 5A, 5B, and 5C are diagrammatic plan views respectively showing rotary recording mediums in eccentric states for a description of the relationship between these states and the displacement range of the cantilever of the reproducing transducer determined by the timing with which the reproducing stylus is lowered and contacts the disc;

FIGS. 6A, 6B, and 6C are graphs respectively indicating tracking control signal outputs in the cases wherein the reproducing stylus is lowered onto the positions indicated in FIGS. 5A, 5B, and 5C;

FIG. 7 is a graph for a description of the operation of a dead zone setting circuit;

FIG. 8 is a circuit diagram of one embodiment of a specific circuit in concrete form of an essential part of the system represented by block diagram in FIG. 4; and FIG. 9 is a block diagram of another embodiment of an essential part of the device of the invention.

DETAILED DESCRIPTION

Figure 1:
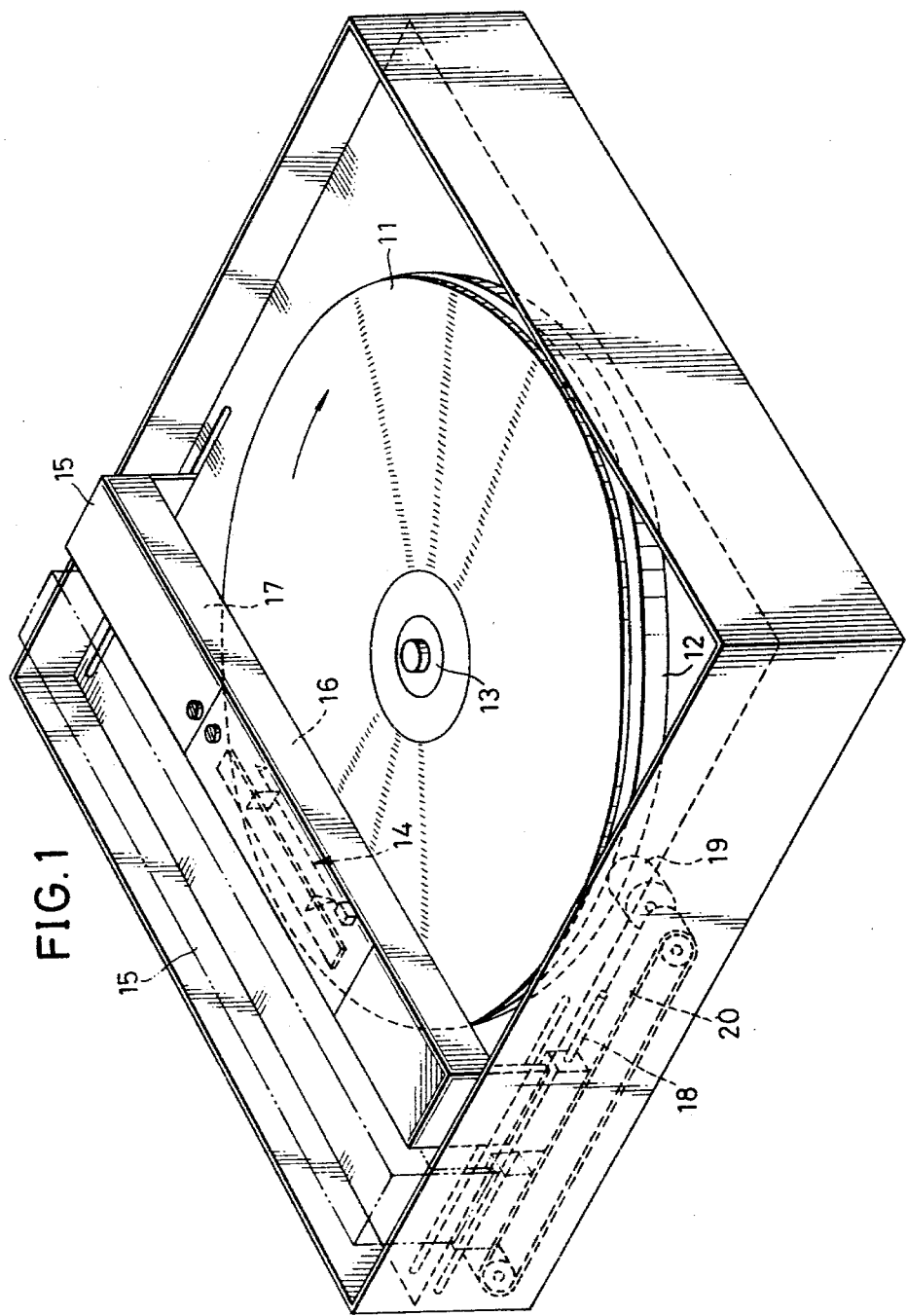
FIG. 1 is a perspective view of a rotary recording medium reproducing apparatus to which a reproducing transducer feeding device according to the present invention can be applied.

The general features of the exterior of a reproducing apparatus for reproducing a rotary recording medium, in which a reproducing transducer feeding device according to the invention can be applied, as illustrated in FIG. 1. In this apparatus, a rotary disc 11 is a rotary recording medium having a video signal recorded thereon. The disc 11 is set on and clamped to a turntable 12 by a clamper 13. The record disc is thus rotated unitarily with the turntable 12 at a rotational speed of 900 rpm, for example.

A signal pickup device 14, as a reproducing transducer, is mounted at a re-entrant cylindrical cavity resonator 16 within a carriage 15. The pickup is connected to a central conductor (not shown) of the resonator. The central conductor is electro-magnetically connected to a high frequency oscillator 17 for producing a frequency of 1 GHz, for example. This organization is well known. The carriage 15 is disposed horizontally above the turntable 12, and is guided at its ends by a pair of parallel horizontal guide bars 18 (only one shown). This carriage 15, driven by an endless belt 20 driven by a motor 19, moves continuously in horizontal translation at a speed equal to the distance of one track pitch per revolution of the turntable 12, during a normal reproducing mode. Otherwise, the carriage may be driven by a feed screw driven by the motor 19. The carriage movement is in synchronism with the rotation of the turntable. As a result of this movement of the carrier 15, a stylus of the signal pickup device 14 travels radially across the disc 11 and traces the spiral track of the disc 11 during rotation.

A video signal of, for example, two frames (that is, four fields) is recorded per each revolution, with spiral track of pits formed on the disc 11 responsive to the information content of the signal. One part of this track is shown in an enlarged scale in FIG. 2. Track turns of the single continuous spiral track, corresponding to each revolution of the disc 11, are designated as $t_1$, $t_2$, $t_3$ .... Each track turn is constituted by the formation of pits 26 of the main information signal along the plane track path and has no stylus guide groove formed. With respect to one track turn $t_1$, in every horizontal scanning period (H) at a position corresponding to the horizontal blanking period, pits 27 of the first pilot signal fp1 are formed on one lateral side of the track as viewed in the track path direction. Pits 28 of the second pilot signal fp2 are formed on the other side of the track.

In the middle position between the centerlines of adjacent track turns, only pits of either one kind of the pits 27 and 28 of the above mentioned reference signals fp1 and fp2 are formed, and with respect to one track, moreover, the sides on which the pits 27 and 28 are formed are alternated for every track turn. That is, if pits 27 and 28 are respectively formed on the right and left sides, for example, of one track turn, pits 28 and 27 will be respectively formed on the right and left sides of each of the adjacent track turns. The third pilot signal fp3 is recorded at a predetermined position on each track turn. This predetermined position is at a selected location which corresponds to the vertical blanking period of the recorded video signal. Pits of the third pilot signal fp3 are not shown in the drawings. The third pilot signal fp3 is used for switching the reproduced first and second pilot signals fp1 and fp2 as described hereinafter. Those pilot signals are disclosed in more detail in the above described prior applications.

One example of the signal pickup device 14 indicated in FIG. 1 will now be described with reference to FIG. 3. This pickup device 14 has a relatively long cantilever arm 33 with a reproducing stylus 31 at its distal free end and a permanent magnet member 32 at its proximal root end. This cantilever arm 33 is supported near its free end by a damper 34 of a Rahmen or rigid frame structure (or rectangular shape). Arm 33 is held near its root part by a damper 35 having a truss structure (of triangular shape). Both of these dampers 34 and 35 are fixed to the lower surface of a substantially horizontal support plate 36. The damper 35 may be omitted.

The support plate 36 is fitted in and held by a holding structure. On the lower surface of plate 36 are fixed a coil 37 for tracking and a pair of coils 38a and 38b for jitter compensation. These coils 38a and 38b are disposed on opposite sides of the tracking coil 37. The above mentioned permanent magnet member 32 is fitted within the tracking coil 37 with gaps therebetween.

Otherwise, tracking control mechanism of the reproducing transducer may be a mechanism as disclosed in the specification of the U.S. patent application Ser. No. 841,531 filed on Oct. 11, 1977, now U.S. Pat. No. 4,152,727, issued May 1, 1979.

The reproducing stylus 31 has a tip thereof having a configuration as indicated in FIG. 2. The reproducing stylus 31 is constituted by a stylus structure 39 made of sapphire and having a disc tracing surface which has a width greater than a track width, and an electrode 40 fixed to the rear face of the stylus structure 39. The electrode 40 is connected with a metal ribbon 41, as indicated in FIG. 3. As the reproducing stylus 31 traces along a track on the disc 11 rotating in the direction indicated by arrow, the video signal recorded thereon by variation of pits is reproduced responsive to variations in the electrostatic capacitance between the surface of the disc 11 and the electrode 40 of the reproducing stylus 31.

Figure 4:
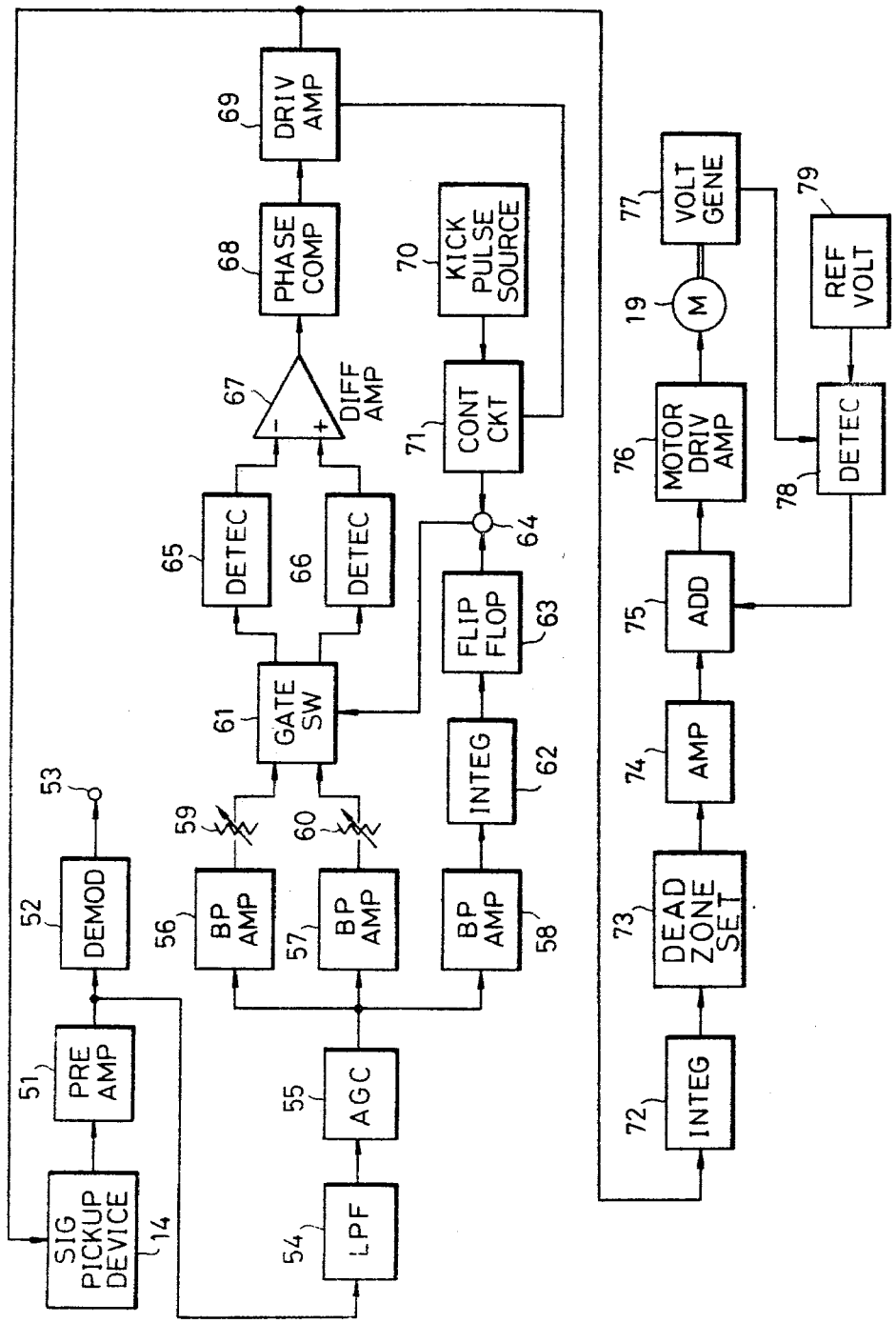
FIG. 4 is a block diagram of one embodiment of the reproducing transducer feeding device according to the invention shown together with a block diagram of a rotary recording medium reproducing apparatus.

In the system shown in FIG. 4, a reproduced signal picked up from the disc 11 as minute variations of electrostatic capacitance by the reproducing stylus 31 of the signal pickup device 14 is supplied to a preamplifier 51 having a resonant circuit. The resonant frequency varies in response to this variation in electrostatic capacitance and is formed into a signal of a desired level. The resulting output of the preamplifier 51, is demodulated into the original information signal by a demodulator 52 and is sent out as an output through an output terminal 53.

The output signal of the preamplifier 51 is supplied to a lowpass filter 54 wherein the reference signals fp1, fp2, and fp3 are separated. The output reference signals pass through an automatic gain control circuit 55 and are supplied respectively to amplifiers 56, 57, and 58. Here, each of the amplifiers 56, 57, and 58 is a kind of band-pass amplifier. The amplifiers 56, 57, and 58 are respectively designed to have steep passing frequency characteristics at only the frequency fp1, fp2, and fp3. As a result, the signals of frequencies fp1 and fp2 are obtained separately from the amplifiers 56 and 57, respectively. These signals respectively pass through level adjustors 59 and 60, where their levels are adjusted. The resulting signals are then supplied to a gate switching circuit 61. These reproduced signals fp1 and fp2 are pulse trains respectively having periods corresponding to 2H (2 horizontal scanning periods). Moreover, they have a coinciding phase in the horizontal blanking period of the reproduced video signal.

The signal fp3 separated and amplified in this band-pass amplifier 100 is supplied to an integration circuit 62. There, its wave is shaped so that it is not affected by noise and other influences. The wave-shaped signal is then applied to trigger a flip-flop 63. The resulting output of this flip-flop 63 is sent out through a terminal 64 and applied to the gate switching circuit 61 as a switching pulse.

Means are provided to suppress the effects of interruption, dropouts, noise, etc., in the signal derived from the tracing stylus 31. To obtain an even more stable and accurate switching pulse, it is desirable to provide a circuit such as a flywheel oscillator, which is a free running oscillator at 15 Hz or an AFC circuit that is capable of accomplishing the same function at a stage prior to the flip-flop 63. A switching pulse from the flip-flop 63 is supplied through the terminal 64 to the gate switching circuit 61. The gate switching circuit 61 switches the signals fp1 and fp2 every revolution period of the disc 11. The disc rotational speed in the present embodiment of the invention is 900 rpm. as mentioned hereinbefore. Therefore, two frames of the video signal are recorded for each revolution of the disc 11. The switching pulse applied to the terminal 64 has inverting polarities which change every two frames (1/15 second). As a result, the gate switching circuit 61 supplies the signals fp1 and fp2 of respectively predetermined polarities to detecting circuits 65 and 66.

The detecting circuits 65 and 66 detect the envelopes of their respective input reference signals and convert the envelopes into DC voltages. These voltages are then supplied to a differential amplifier 67. This differential amplifier 67 compares the output signals of the two detecting circuit 65 and 66 which vary in response to the reproduced levels of the signals fp1 and fp2. This generates an output tracking error signal which indicates the tracking error direction and the error quantity. This error signal passes through a phase compensation circuit 68 and is further amplified to a specific level by a driving amplifier 69. Then, it is applied to the tracking coil 37 of the signal pickup device 14 as a control signal to control it. As a result, the permanent magnet 32 undergoes a displacement within the coil 37, and, in conformity with this, the cantilever 33 also undergoes a displacement, whereby the reproducing stylus 31 is tracking controlled so that the above mentioned tracking error signal becomes zero, that is, so that the stylus 31 traces correctly the track of the disc 11.

At the time of a special reproducing mode of operation such as still reproduction, slow-motion reproducion, quick-motion reproduction, or reversing reproduction, or of random access mode of operation, kick pulses from a kick pulse supply source 70 are supplied by way of a control circuit 71 and the terminal 64 to the gate switching circuit 61 and, at the same time, from the control circuit 71 to the driving amplifier 69. As a result, the reproducing stylus 31 is shifted from one track turn to an adjacent track turn within the vertical blanking period.

In the case where, as indicated in FIGS. 5A, 5B, and 5C, although the distance of eccentricity is exaggerated relative to that in an actual case, the disc 11 is placed on the turntable 12 in an eccentric state wherein the disc center P is offset from the center O of rotation of the turntable 12, the tracking control state differs depending on the timing of the lowering of the reproducing stylus 31 of the signal pickup device 14 onto the rotating disc 11. More specifically, for example, FIG. 5A shows the case wherein the reproducing stylus 31 is lowered on a point $S_1$ on a track T at the instant when the center P of the disc 11 is at the most rightward position as viewed in the figure from the center O of rotation of the turntable 12. Since the track T rotates about the point O, the reproducting stylus 31 undergoes a displacement between the point $S_1$ and a point $S_{1a}$ in the case of tracking servo control to cause the stylus to trace the track T. Accordingly, the cantilever 33 is in its neutral state when the reproducing stylus is on the point $S_1$ but is displaced toward the left side as viewed in FIG. 5A as the stylus 31 approaches and reaches the point $S_{1a}$.

Therefore, in the case where the reproducing stylus is lowered with the timing indicated in FIG. 5A, the tracking servo must operate with respect to only one side of the neutral point (i.e., operational center point), and normal tracking servo operation becomes difficult when the reproducing stylus must undergo displacement to the side closer to the point $S_{1a}$. Furthermore, when the reproducing stylus traces over the disc 11 at only an offset position, it is in contact with the disc in a state where it is inclined to only one side. For this reason, there arises the problem of uneven wear on one side.

In the case where the reproducing stylus is lowered onto the point $S_2$ of the track T when, as indicated in FIG. 5B the point P is in the same position as the point O in the left-right direction as viewed in the figure, the reproducing stylus undergoes a displacement merely between points $S_{2a}$ and $S_{2b}$, and the cantilever 33 is merely displaced to the left and right relative to its neutral point. In this case, therefore, there is no particular trouble with respect to the tracking servo operation.

Furthermore, in the case where, as indicated in FIG. 5C, the reproducing stylus is lowered onto the point $S_3$ of the track T when the point P is at the most leftward position as viewed in the figure relative to the point O, the reproducing stylus must undergo a displacement between the point $S_3$ and a point $S_{3a}$, and the centilever 33 must undergo displacement to only the right side as viewed in the figure from its neutral state. In this case also, the same problem as that in the case illustrated in FIG. 5A is encountered.

Moreover, since the disc 11 is rotating eccentrically about the point O, the state of the disc at the instant when the reproducing stylus contacts the disc when the stylus is lowered onto the disc cannot be determined. That is, the disc 11 may be in any of the states indicated in FIGS. 5A, 5B, and 5C, or it may be in any state intermediate between these states. Accordingly, according to the present invention, the feed of the reproducing transducer 14 is controlled in order to solve the above described problem in the case of the state indicated in FIG. 5A or 5C thereby to cause the cantilever 33 to undergo left and right displacement with its neutral point as a center at the time of tracking control. More specifically, in the case illustrated in FIG. 5A, relative displacement control is carried out so that the point $Q_1$ moves leftward as viewed in the figure so as to reach a position corresponding to the midway point between the points $S_{1a}$ and $S_{1b}$. In the case indicated in FIG. 5C, relative displacement control is carried out so that the point $Q_3$ moves rightward as viewed in the figure so as to reach a position corresponding to the midway point between the points $S_3$ and $S_{3a}$.

Referring again to FIG. 4, the reproducing transducer feeding device of the invention for carrying out this relative displacement control will now be described. The output error signal of the aforementioned driving amplifier 69 is supplied to the coil 37 for a tracking of the aforementioned signal pickup device 14 and, at the same time, is supplied to an integration circuit (a low-pass filter) 72, when the signal is integrated. In the case where the reproducing stylus traces the track T in the state indicated in FIG. 5A, 5B, or 5C, the output error signal exhibits a waveform $E_1$, $E_2$, or $E_3$ as indicated in FIG. 6A, 6B, or 6C, respectively. The signal $E_1$, $E_2$, or $E_3$ is integrated in the integration circuit 72, from which, respectively, a DC voltage is obtained.

The output of the integration circuit 72 is supplied to a dead zone setting circuit 73. As indicated in FIG. 7, this dead zone setting circuit 73 does not produce an output with respect to a signal which is within a specific range L and is of an absolute value of a level lower which is than a specific level $\pm l_1$ as indicated by a waveform $E_{4a}$ but produces an output signal with respect to a signal outside of the specific level range L as indicated by signals $E_{1a}$ and $E_{3a}$, this output signal of the circuit 73 being responsively according to the level of the error signal. Accordingly, the dead zone setting circuit 73 has a dead zone with respect to signals of levels within the specific level range L. The output of the dead zone setting circuit 73 is amplified by an amplifier 74 and then supplied to an adder 75.

On the other hand, a rotation detection voltage generated from a voltage generator 77, as a result of the rotation of the aforementioned motor 19, is supplied to a discriminator 78, where it is compared with a reference voltage from a reference voltage generator 79. A voltage responsive to the difference between the rotation detection voltage and the reference voltage is obtained from the discriminator 78 and supplied to the adder 75, where it is added to the signal from the amplifier 74. The resulting output signal of the adder 75 is amplified by a motor driving amplifier 76 and then applied to the motor 19 to control its rotational speed.

Here, the loop comprising the voltage generator 77, the discriminator 78, the reference voltage generator 79, and the motor driving amplifier 76 constitutes a conventional constant-speed servo loop with respect to the motor 19. The novelty of the present embodiment of the invention resides in the feature that a system comprising the integration circuit 72, the dead zone setting circuit 73, the amplifier 74, and the adder 75 is provided to control the rotation of the motor in response to a tracking control signal (i.e., a tracking error signal).

The motor 19 is so controlled by a signal of a waveform such as $E_1$ or $E_3$ supplied through from the integration circuit 72 through the dead zone setting circuit 73 that the level of the signal becomes a level within the dead zone level range L. As a result, the feed of the reproducing transucer is driven in feeding motion by the motor 19. The rotation of the motor is controlled so that the proximal end point $Q_1$ or $Q_3$ of the cantilever 33, in the state indicated in FIG. 5A or 5B, is shifted to a position corresponding to the midway position between the points $S_1$ and $S_{1a}$ or between the points $S_3$ and $S_{3a}$. Therefore, the cantilever 33 thereafter undergoes displacement to the left and right relative to its neutral state as a center and is thus tracking controlled.

There is almost no problem in the case where, as indicated in FIG. 5B, the cantilever 33 is in the state of tracking control with its neutral position substantially as a center. For this reason, the above described dead zone setting circuit 73 is provided so that the rotation of the motor 19 will not be finely controlled in response to the tracking control signal also in such a case.

Furthermore, the time constant of the above mentioned integration circuit 72 is set at a value within a range which is, for example, 2 to 50 times the period of one revolution of the disc 11. However, if this time constant is excessively large, the kick pulses applied from the kick pulse supply source 70 at the time of random access operation will also be integrated at the same time by the integration circuit 72. This will give rise to a delay in the rotation control operation with respect to the motor 19 and failure of the movement of the reproducing transducer assembly driven by the motor 19 to catch up with the operation wherein the reproducing stylus 31 is skipping over successive track turns. Ultimately, it will become impossible to carry out the tracking control operation. Therefore, it is desirable to set the time constant of the integration circuit 72 at a value within the above stated range. For example, in the case where the access time of the random access mode of operation is of the order of 2 seconds, the integration time constant of the integration circuit 72 is set at a value of the order of 0.33 second.

The width of the dead zone range L of the dead zone setting circuit 73 is set at a large value in FIG. 7, but it may be set at a value of the order of twice the peak-to-peak value of the waveform of the output integrated signal of the integration circuit 72.

One example of a specific electrical circuit in concrete form of an essential part of the device shown in the form of a block diagram in FIG. 4 is shown in FIG. 8. A tracking control signal from the driving amplifier 69 is applied to this circuit through a terminal 81 and is integrated by the integration circuit 72 comprising a resistor R1 and a capacitor C1. The output of this integration circuit is then supplied by way of a transistor $Q_1$ constituting a buffer amplifier to the dead zone setting circuit 73.

This dead zone setting circuit 73 comprises a first series-connected combination of diodes D1 and D2 in the regular direction connected in parallel with a second series-connected combination of diodes D3 and D4 in the reverse direction. The number of diodes thus connected is determined in accordance with the threshold voltage of the dead zone to be set. For example, the number n of diodes to be connnected in series is expressed by the equation $n = Vs/Vac$, where Vs is the threshold voltage and Vac is the voltage in the regular direction between the anode and cathode of the diode (e.g., approximately 0.7 V in the case of a silicon diode).

The resulting output signal of the dead zone setting circuit 73 is supplied through the amplifier 74 capable of varying, adjusting, and setting the gain to the adder 75. The adder 75 operates to add at the point 83 the output signal from the amplifier 74 which signal has passed through a resistor R4 and the output signal of the discriminator 78, which signal has been introduced through a terminal 82 and has passed through a resistor R5. The resulting output signal of the adder 75 is led out through an output circuit comprising resistors R6 through R9, diodes D5 and D6, and transistors $Q_2$ and $Q_3$ and is supplied through a terminal 84 to the motor driving amplifier 76.

While, in the embodiment of the invention illustrated in FIG. 4, the constant-speed loop comprising the voltage generator 77, the discriminator 78, the reference voltage generator 79, and the adder 75 is used, this loop may be omitted as in another embodiment of the invention illustrated in FIG. 9. In FIG. 9, those parts which are the same as or equivalent to corresponding parts in FIG. 4 are designated by like reference numerals. Description of such parts are omitted. In this case, the rotation of the motor 19 is controlled only on the basis of the tracking control signal supplied from the driving amplifier 69 through a terminal 85.

Further, this invention is not limited to these embodiments. Variations and modifications may be made without departing from the scope of the invention.

What is claimed is:

1. In an apparatus for reproducing signals from a rotary recording medium having an information signal recorded in the track formed thereon in a spiral path or a concentric circular form and having reference signals recorded thereon interrelatedly with the information signal track, the combination therewith of a feeding device for feeding a reproducing transducer means having a reproducing element for reproducing the information signal and the reference signals recorded on the rotary recording medium, and tracking control means for accomplishing tracking control so that the reproducing element traces the information signal track, the feeding device comprising:

a driving power source means for driving the reproducing transducer means in a feeding travel over the rotary recording medium, with transducer movement in the radial direction thereof;

means for producing a tracking control signal in response to the reference signals reproduced by the reproducing transducer means and for supplying the tracking control signal to the tracking control means;

means including an integrating circuit for providing a DC component signal of the tracking control signal thus produced; and dead zone setting means for supplying the DC component signal thus provided to the driving power source means only if the level of the DC component signal is outside a specific predetermined level dead zone range, said driving power source means being controlled in response to the DC component signal supplied through said dead zone setting means.

2. A reproducing transducer feeding device as claimed in claim 1 in which the dead zone setting means comprises at least two diodes connected in parallel with mutually opposite polarity.

3. A reproducing transducer feeding device as claimed in claim 1 which further comprises: detection means for detecting the operation of the driving power source; means for comparing the detection output of the detection means and a reference voltage and responsively producing an error voltage; and addition means for adding the DC component signal and the error voltage and supplying the resulting signal to the driving power source.

4. A reproducing transducer feeding device as claimed in claim 1 in which the integrating circuit has a time constant equal to a value within the range of 2 to 50 times the period of one revolution of the rotary recording medium.

* * * * *